July 7, 1925.

J. M. THOMPSON ET AL

ATTACHMENT FOR AUTOMOBILES

Filed March 1, 1924

1,544,611

INVENTORS.
John M. Thompson
and William H. Thompson,
by Parker & Rockwow,
Att'ys.

Patented July 7, 1925.

1,544,611

UNITED STATES PATENT OFFICE.

JOHN M. THOMPSON AND WILLIAM H. THOMPSON, OF BUFFALO, NEW YORK.

ATTACHMENT FOR AUTOMOBILES.

Application filed March 1, 1924. Serial No. 696,330.

*To all whom it may concern:*

Be it known that we, JOHN M. THOMPSON and WILLIAM H. THOMPSON, citizens of the United States, residing at Buffalo, in the county of Erie and State of New York, have invented a new and useful Improvement in Attachments for Automobiles, of which the following is a specification.

This invention relates to attachments for automobiles, and the objects of this invention are to provide an attachment of this kind which is permanently secured to an axle of an automobile and which is provided with a part adapted to act as a jack for raising the car; also to provide an attachment of this kind with means enabling the device to act as a shock absorber; also to improve the construction of devices of this kind in the other respects hereinafter specified.

In the accompanying drawings:—

Jacks for automobiles have heretofore been detached from the automobile itself and consequently when it was desired to elevate one of the wheels it is necessary to put the jack under the axle adjacent to the wheel to be elevated. It frequently happens that the wheel to be elevated is in a rut or in the mud so that the jack cannot be placed under the axle and also sometimes the part of the axle to which the jack is to be applied is in a somewhat inaccessible portion of the car so that considerable difficulty is experienced in placing the jack under the desired part of the car. For this reason one of the objects of our invention is to secure the jack permanently on a part of the car so that whenever it becomes necessary to raise a wheel it is only necessary to apply the lifting power to the jack adjacent that wheel. It has also been found that the housing or casing of the lifting device or jack can readily be utilized as a part of a shock absorbing device so that the attachment may be used for the two-fold purpose of elevating the part of the car to which it is attached, and also as a shock absorber.

It is intended to use four of these attachments on an automobile, one being arranged adjacent to each of the four wheels of the car, but it will be understood that one or more of these devices may be used, as desired. In the particular construction illustrated, the attachment is shown on one side of a front axle A of a car, and B represents a wheel arranged on the end of the front axle. C represents a frame member forming a part of or secured to the body of the car, and is supported from the front axle by means of a spring C'. All of these parts may be of any suitable or desired construction and will, of course, vary in construction in different makes of cars.

Our improved attachment includes a housing D, which in the construction shown is substantially cylindrical and is provided with suitable means for rigidly attaching the same to an axle of a car, such as a pair of laterally projecting arms or brackets $d$ $d'$, which are adapted to be secured to the upper and lower faces of the axle A for holding the tubular member D rigidly on the axle, the arms or extensions being provided with holes through which bolts $d^2$ may pass in such a manner that the two bolts will be arranged at opposite sides of the axle. Any other securing means may be employed, if desired.

Figure 1:
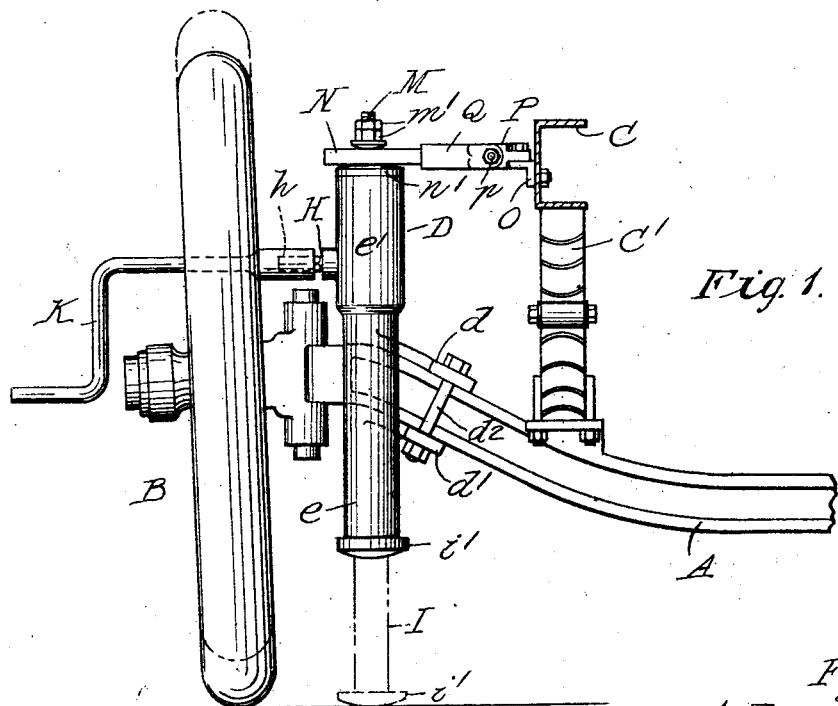
Fig. 1 is a fragmentary front elevation of one side of the front axle of an automobile having an attachment embodying our invention mounted thereon.

The housing member D forms a support or guide for a lifting device or jack which may be of any suitable or desired construction. To illustrate one embodiment of our invention a screw jack is shown arranged in the lower end of the housing and for this purpose the housing shown is provided with a lower portion $e$ of reduced diameter and an upper portion $e'$ of slightly larger diameter, and an inwardly extending flange E is arranged substantially at the juncture of these two parts of the tubular housing. This inwardly extending flange cooperates with a collar $f$ of a vertical screw shaft F, and a bevel gear $g$ is arranged on this shaft which is adapted to cooperate with a bevel gear $g'$ mounted on the inner end of a shaft H extending into the housing, preferably at the enlarged portion of the same and journalled in a bearing lug formed on the housing. The outer end of this shaft is provided with a part $h$ adapted to cooperate with a socket member of a wrench or analogous device K, Fig. 1, for turning the shaft H in order to effect a turning of the shaft F through the medium of the bevel gear.

The screw shaft engages a vertically movable plunger I arranged within the lower portion of the cylindrical housing D, which is closed at its upper end and provided therein with a threaded hole in which the screw shaft F engages. Preferably, the plunger is also provided intermediate of its ends with another part with which the screw shaft engages, for example, a sleeve $i$ secured to the plunger I, and having a central threaded hole in which the screw shaft also engages. It will be evident from the construction described that if the shaft H is turned in one direction, the plunger I, which is preferably provided at its lower end with a foot or base $i'$, will be moved into the lower position shown in dotted lines in Fig. 1, in which position the wheel B will be raised off the surface of the road or other support, and by turning the shaft H in the opposite direction the plunger may be drawn into the cylindrical housing D, which forms a guide for the plunger. A pin $i^2$ secured to the housing D enters a slot or keyway $i^3$ in the plunger I and prevents the same from turning with the screw shaft, and if desired, the pin and slot may also be used to limit the extent to which the plunger may move out of the housing, by the engagement of the pin with the upper end of the keyway $i^3$. Other means for preventing the plunger from turning in the housing and for limiting the movement of the plunger in the housing may be employed.

Figure 3:
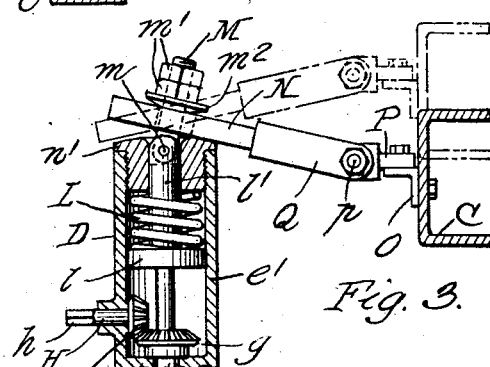
Fig. 3 is a fragmentary central sectional elevation thereof showing parts of the shock absorbing devices in different positions from those shown in Fig. 2.

The shock absorbing means used in connection with this attachment may be of any suitable or desired kind, that shown including a compression spring L arranged in the upper portion of the cylindrical housing and engaging at its lower end with an enlarged or disk shaped portion $l$ of a plunger which has an upwardly extending tubular portion or hollow stem $l'$. The upper end of the hollow stem $l'$ is preferably slotted or bifurcated and has a pivotal connection with a flat sided screw link M, a pivot pin $m$ connecting the hollow stem with the link M. The upper end of the link M extends through a slot $n$ in a swinging arm or lever N, which normally rests upon a cap or plug $n'$ rigidly secured in the upper end of the cylindrical housing D. The opposite sides of the link M, in the construction shown are rounded and threaded and are adapted to receive nuts $m'$ which bears upon the upper face of the lever N, a washer $m^2$ being preferably interposed between the nuts and the lever. The sides of the slot $n$ engage with the flat sides of the link M and prevent this link from turning relatively to the lever N. The lever is adapted to swing in opposite directions about its connection with the link M, as shown in Fig. 3, and upon swinging in either direction from the horizontal position, the lever will draw the link outwardly with reference to the housing, so that the spring L will be compressed through the medium of the lower flange or disk portion $l$ of the plunger. In order to guide the plunger in its movement, the upper end of the screw shaft or rod F of the jack or lifting device extends into the hollow stem $l'$ of the plunger of the shock absorber.

Figure 2:
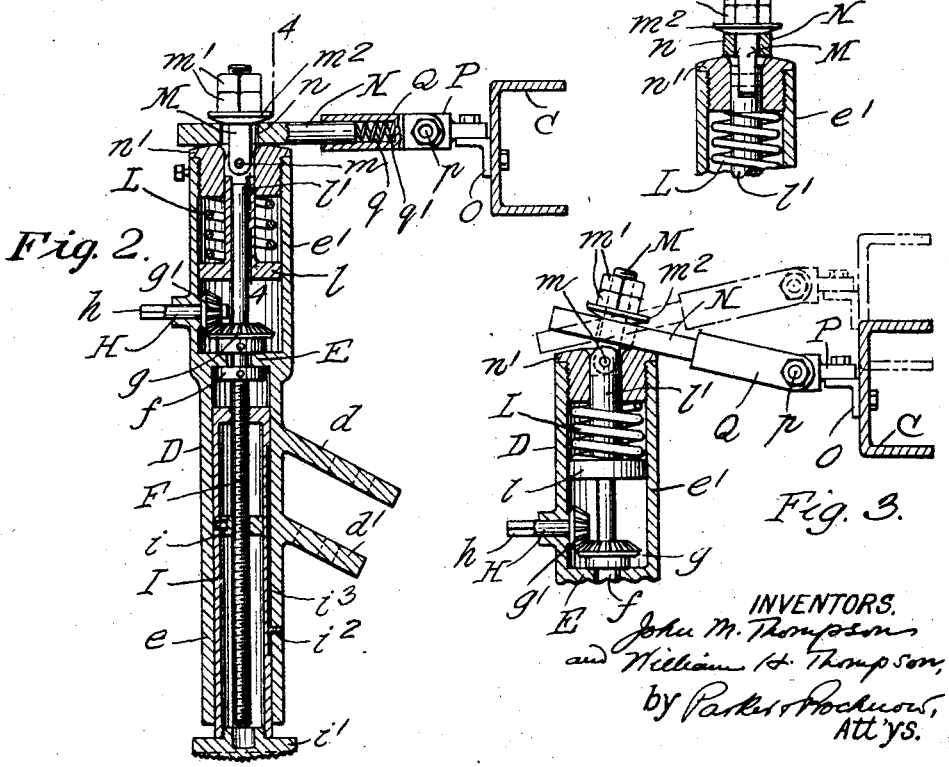
Fig. 2 is a central sectional elevation of the attachment.
Figure 4:
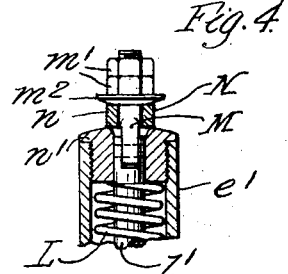
Fig. 4 is a fragmentary section thereof on line 4—4, Fig. 2.

The swinging arm or lever N may be connected with a part of the body of the automobile in any suitable or desired manner. In the particular construction shown, the frame member C of the body has secured thereto a bracket O, which has an outwardly extending flange to which a pivot member P is secured, for example, by means of a bolt $p$. This pivot member cooperates with another pivot member Q having a socket $q$ into which one end of the rocking arm or lever N is adapted to extend, and a spring $q'$ is preferably interposed between the end of the swinging lever N and the inner end of the socket $q$. By means of this connection it will be evident that the vertical movement of the body relatively to the axle will be transmitted to the lever N, causing the same to rock in either direction from the position shown in Fig. 2, and by engaging with the curved upper face of the cap $n'$ and the opposite edges thereof, the lever N will pull the link M upwardly against the action of the spring, and compress the spring L, thus absorbing shocks to which the body of the automobile would be otherwise subjected. The spring $q'$ and the sliding connection between the lever N and the pivot member Q will absorb any side sway or lateral movement of the body relatively to the chassis and thus prevent the side sway from damaging the shock absorber, as well as cushioning the side sway of the body.

Both the shock absorbing device and the jack which have been described are illustrated merely for the purpose of showing one embodiment of our invention, but it will be understood that it is not intended to limit the claims of this application to any specific form of shock absorber or jack.

We claim as our invention:

1. An attachment for automobiles including a guide part rigidly secured to the axle of an automobile, and a part movably mounted thereon and adapted to be moved downwardly into contact with a supporting surface for raising the axle of the automobile relatively to said surface, shock absorbing means arranged in the upper end of said rigidly secured part, and yielding means connecting said shock absorbing means with a part of the body of the automobile.

2. An attachment for automobiles including a vertically arranged cylinder rigidly secured to an axle of an automobile and forming a rigid housing for the attachment, a plunger in said cylinder movable downwardly to raise said axle and guided by said cylinder, and means movably arranged within said cylinder to act as a shock absorber for said automobile.

3. An attachment for automobiles including a vertically arranged cylinder rigidly secured to an axle of an automobile and forming a rigid housing for the attachment, means on the lower part of the cylinder and guided by said cylinder for raising the axle of the automobile from a supporting surface, and shock absorbing means movably arranged within and cooperating with the upper part of said cylinder.

4. An attachment for automobiles including a guide member adapted to be rigidly secured to the axle of an automobile a movable member mounted on said guide member and vertically adjustable thereon, a threaded rod engaging said movable member to move the same vertically and rotatably held against longitudinal movement on said guide member, and means for turning said rod.

5. An attachment for automobiles including a cylinder rigidly secured in a substantially upright position to the axle of an automobile, a plunger arranged in said cylinder, a screw rod journalled in said cylinder and having a threaded engagement with said plunger, and gears in said cylinder for turning said screw rod for causing said plunger to elevate the portion of the automobile to which said cylinder is attached.

6. An attachment for automobiles including a cylinder rigidly secured in a substantially upright position to the axle of an automobile, a plunger arranged in said cylinder, a screw rod journalled in said cylinder and having a threaded engagement with said plunger, gears in said cylinder for turning said screw rod for causing said plunger to elevate the portion of the automobile to which said cylinder is attached, a shaft on which one of said gears is secured and which is journalled in said cylinder, and which has an end extending outwardly from said cylinder in a direction to be readily accessible for turning, to actuate said screw rod.

7. An attachment for automobiles including a housing rigidly secured in a substantially upright position to the axle of an automobile, means arranged in and guided by the lower end of said housing for elevating the part of the automobile to which said housing is secured, a compression spring in the upper part of said housing and an arm connecting said compression spring with the body of an automobile to cause said spring to absorb shocks.

8. An attachment for automobiles including a housing rigidly secured in a substantially upright position to the axle of an automobile, means in the lower end of said housing for elevating the part of the automobile to which said housing is secured, a compression spring in the upper part of said housing, a cap closing the upper end of said housing, a link extending through said cap and connected with the lower end of said spring, and an arm having a swinging connection with said link and with the body of the automobile causing the movements of the body relatively to the axle to compress said spring.

9. An attachment for automobiles including a tubular housing rigidly secured in a substantially upright position to the axle of an automobile, means in the lower end of said housing for elevating the part of the automobile to which said housing is secured, a compression spring in the upper part of said housing a cap closing the upper end of said housing, a link extending through said cap and connected with the lower end of said spring, an arm which rests on said cap and which is engaged by said link and pressed into engagement with said cap, and a pivoted connection between the body of said automobile and said arm for causing the arm to swing on said cap to raise said link against the action of said spring.

10. An attachment for automobiles including a housing rigidly secured in a substantially upright position to the axle of an automobile, means in the lower end of said housing for elevating the part of the automobile to which said housing is secured, a compression spring in the upper part of said housing, an arm pivotally connected with the body of the automobile and having a connection with said spring to cause said spring to absorb shocks and means for preventing the transmission to said spring of lateral movement of the body relatively to said housing.

11. An attachment for automobiles including a housing secured on the axle of the automobile, a screw jack in the lower part of said housing and including an upright screw shaft, a shock absorbing device arranged in the upper part of said housing and including a member movably arranged on the upper end of said screw shaft, a spring which normally depresses said member, and an arm connected with the body of the automobile and with said member for moving said member against the action of said spring when said body moves vertically relatively to said housing.

12. An attachment for automobiles including a housing secured on the axle of the automobile, a screw jack in the lower part of said housing and including an upright screw shaft, a shock absorbing device arranged in the upper part of said housing and including a member movably arranged on the upper end of said screw shaft, a spring which normally depresses said member, an arm pivotally connected with the body of the automobile and having a connection with said member to cause said spring to absorb shocks, and means for preventing the transmission to said member of lateral movement of the body relatively to said housing.

JOHN M. THOMPSON.
WILLIAM H. THOMPSON.